United States Patent
Kistler et al.

(10) Patent No.: US 6,857,005 B2
(45) Date of Patent: Feb. 15, 2005

(54) CONSOLE INTERACTION HANDLING IN A DATA PROCESSING NETWORK

(75) Inventors: Michael David Kistler, Pflugerville, TX (US); Freeman Leigh Rawson, III, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 792 days.

(21) Appl. No.: 09/886,188

(22) Filed: Jun. 21, 2001

(65) Prior Publication Data

US 2002/0198934 A1 Dec. 26, 2002

(51) Int. Cl.[7] .............................................. G06F 15/16
(52) U.S. Cl. ........................ 709/203; 709/223; 709/250
(58) Field of Search ................................. 709/200, 203, 709/223–224, 230, 250; 370/401, 252

(56) References Cited

U.S. PATENT DOCUMENTS

| | | | | |
|---|---|---|---|---|
| 5,951,694 A | * | 9/1999 | Choquier et al. | 709/203 |
| 5,958,010 A | * | 9/1999 | Agarwal et al. | 709/250 |
| 6,519,649 B1 | * | 2/2003 | Arimilli et al. | 709/200 |
| 6,704,873 B1 | * | 3/2004 | Underwood | 709/223 |
| 2002/0146018 A1 | * | 10/2002 | Kailamaki et al. | 370/401 |

* cited by examiner

*Primary Examiner*—Bharat Barot
(74) *Attorney, Agent, or Firm*—Joseph P. Lally; Casimer K. Salys

(57) ABSTRACT

A data processing network in which console interactions are communicated to and from server appliances over the network. The system may include a server appliance configured to re-direct serial port transactions to a network port. The service appliance may include a mechanism for transmitting and receiving console data and control information via the network. The system further includes a console server for accepting and displaying console traffic that is sent over the network by a server appliance and for transmitting commands entered by a user back to the server appliance for processing.

20 Claims, 2 Drawing Sheets

CONSOLE INTERACTION HANDLING IN A DATA PROCESSING NETWORK

BACKGROUND

1. Field of the Present Invention

The present invention generally relates to the field of data processing networks and more particularly to a system and method for facilitating console interactions in a network featuring a plurality of server appliances.

2. History of Related Art

It is becoming increasingly common to encounter data processing systems that include a farm or cluster of server appliances. For purposes of this disclosure, a server appliance is a computer system specialized to run a single server application, such as a web server or firewall. Server appliances must be able to communicate, at least occasionally, with a system administrator. The computer system console is the primary device used to interact with the system administrator. The console differs from terminal devices (sometimes referred as TTYs) in that the console is functional in virtually all modes of operation whereas systems can be configured to run without terminals in some or all operating modes. In addition, the console is one of the very first devices activated in the boot sequence so that the system administrator can observe and control system operation as early as possible.

A distinction is made here between the concept of a console interface and a console device. A console device refers to the actual hardware such as a keyboard, mouse, and video terminal, through which the majority of communication to a system administrator is provided. A console interface refers to the operating system's support of an application program interface to a console device. This interface frees the application program from having to worry about the actual hardware implementation of the console.

A characteristic of server appliances is that their operation and management are greatly simplified in comparison to general-purpose server systems. As an example, server appliances are typically operated without a console device. More specifically, the server appliance typically does not include a locally attached display, keyboard, or mouse. Unfortunately, certain situations require the system or network administrator to interact with the server appliance through the server's console interface. Accordingly, some method of accessing the server appliance console must be provided.

Referring now to FIG. 1, one common arrangement of providing console device access to server appliances in a network 100 is depicted. As depicted, a plurality of server appliances 102 are connected to each other via a network medium such as an Ethernet connection. In addition, each server appliance 102 includes a connection for a keyboard, mouse, and video terminal (or other suitable display unit). Although FIG. 1 indicates physically distinct connections for the keyboard, mouse, and video, these connections may be provided using a single cable or wire. The KVM (keyboard-video-mouse) connections from each server appliance 102 are provided to a switch 104, which is itself connected to a keyboard 106, a mouse 108, and a video terminal 110. Using the arrangement, the network administrator can transmit and receive console interactions to/from each of the server appliances 102 by appropriate setting of switch 104.

An important goal in the design of any server appliance is to minimize the cost of the system and to make it easy to set up and operate. Additionally, for systems such as the systems described herein, which are intended to be aggregated in large numbers, it is highly desirable to minimize the overall cost of the cluster by reducing or eliminating the amount of supporting hardware required.

One of the sources of cost and complexity in current server appliances is the extra cabling and switching required to provide console access to the server. This extra cabling can become a major issue in server farm environments where large numbers of server appliances are congregated together in a single rack or set of racks. Therefore, it would be highly desirable to provide a system and method for transmitting console traffic to selected server appliances without requiring additional cabling and other hardware. It would be further desirable if the implemented solution leveraged, to the extent possible, existing features of the network to minimize the cost and complexity of implementing the invention.

SUMMARY OF THE INVENTION

The problems identified above are in large part addressed by a system and method in which console interactions are communicated to and from network server appliances over the network to which the servers are connected. In one embodiment, the system includes a server appliance having software, firmware, hardware, or a combination thereof, that is configured to re-direct serial port interactions to a network port. The server appliance includes a mechanism for transmitting and receiving console data and control information via the network. The system further includes means for accepting and displaying console traffic that is sent over the network by a server appliance and transmitting commands entered by a user back to the server appliance for processing.

In one embodiment, the firmware of the server appliance is enabled to capture console interactions directed to one of the sewer appliance's serial ports and re-direct these interactions over the network. The firmware of the server appliance may use existing firmware features, such as the network features of DHCP support, to transmit and receive the console traffic via the network. Another system attached to the network is configured to receive the console interactions from the network and display them on a directly attached console device. This system may include an application that uses network interactions similar to Telnet to receive console interactions from the network, and serial line communications features similar to a serial terminal emulator such as the Minicom emulator. In one embodiment, this application is configured to display multiple windows, where each window displays the console communications of a corresponding sewer appliance.

BRIEF DESCRIPTION OF THE DRAWINGS

Other objects and advantages of the invention will become apparent upon reading the following detailed description and upon reference to the accompanying drawings in which.

Figure 1:
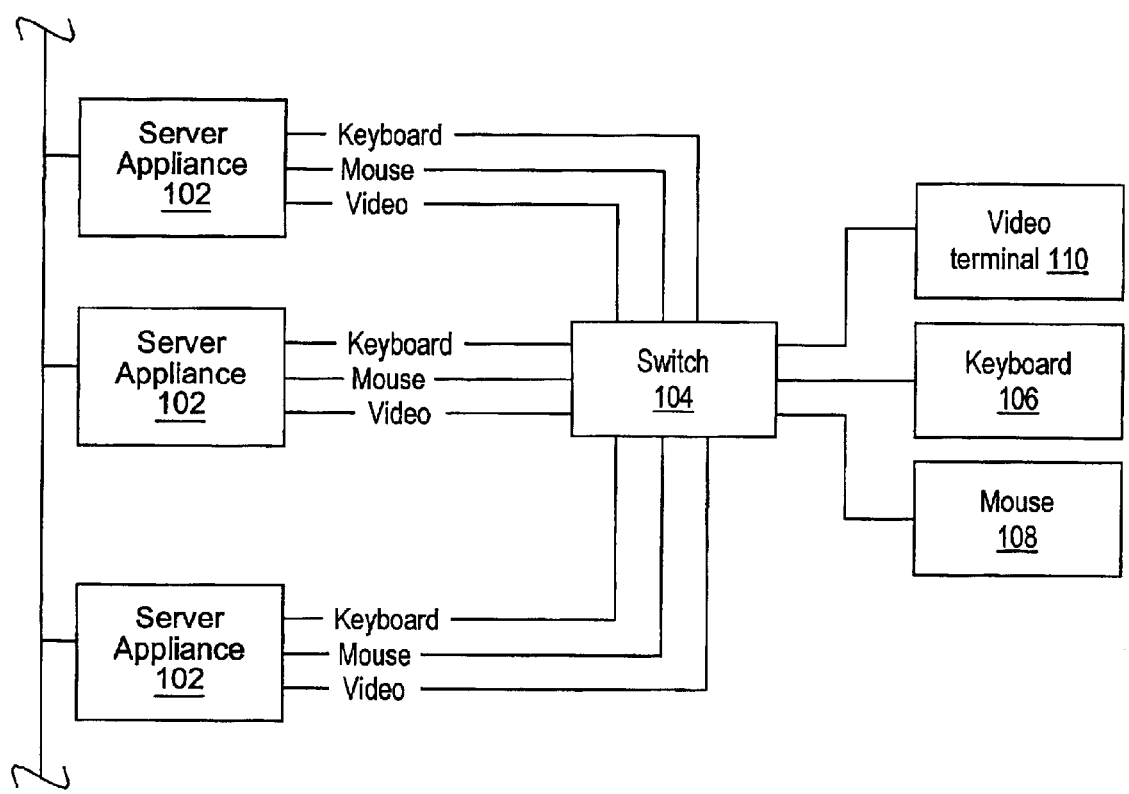
FIG. 1 is a block diagram of selected features of a data processing network according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF AN EMBODIMENT OF THE INVENTION

Generally speaking, the invention contemplates a system and method by which server appliance console interactions in a computer network are routed over the network between the server appliances and a remote workstation referred to herein as the console server. The network interface card of each server appliance is designed to capture interactions issued to the serial port. The network card then "wraps" the interactions, which are formatted according to a serial protocol, in a network protocol for transmission across the network to the console server, which serves as the console device. The console server includes an application program that combines features of a standard terminal emulator designed to communicate with a host over a serial line with features of a network-based means for communicating with a remote device. By enabling console interactions to travel over the existing network, the invention eliminates the extra hardware and cabling typically associated with traditional KVM switches thereby reducing overall network costs and simplifying network installation and maintenance.

Figure 2:
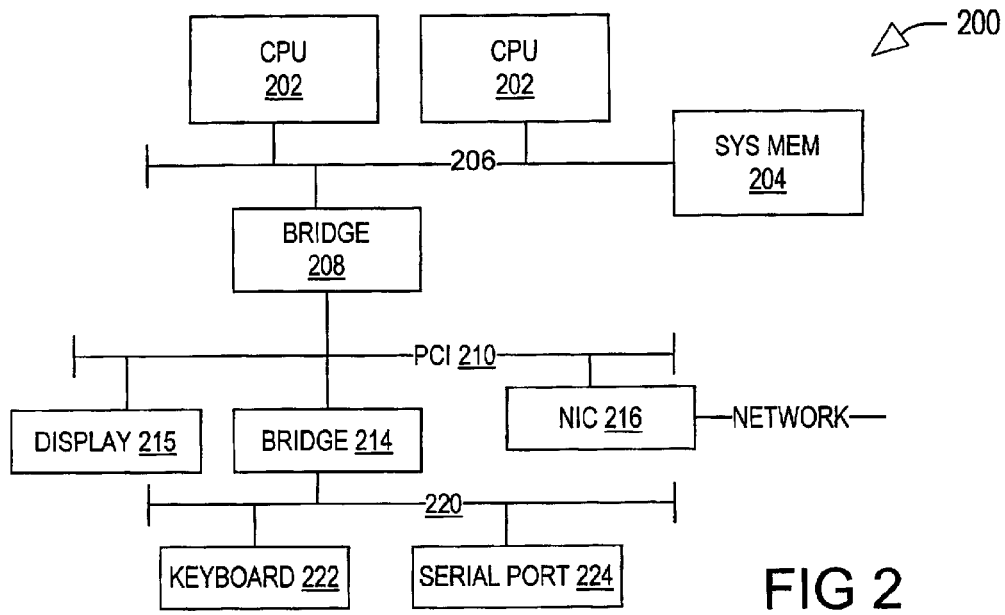
FIG. 2 is a block diagram of selected features of a server appliance according to one embodiment of the present invention.

Turning now to the drawings, FIG. 2 illustrates selected features of a server appliance 200 suitable for use with the present invention. In the depicted embodiment, server appliance 200 includes one or more central processing units (CPUs) 202 and a system memory 204 connected to a host bus 206. CPUs 202 may be implemented with any of a variety of commercially available microprocessors including, as examples, the PowerPC® line of processors from IBM Corporation as well as x86 style processors available from a number of vendors.

A host bridge 208 connects host bus 206 with a peripheral bus 210, which is typically compliant with an industry standard peripheral bus specification such as the Peripheral Components Interface (PCI) specification. See, *PCI local bus specification Rev.* 2.2, available from the PCI Special Interest Group and incorporated by reference herein. Numerous peripheral devices may be attached to peripheral bus 210 including a display device 215 and a network interface card (NIC) 216 that provides a connection between server appliance 200 and the network to which it is attached.

In one embodiment, server appliance 200 further includes an expansion bridge 214 that connects peripheral bus 210 with an expansion bus 220. Expansion bus 220 may conform to a legacy bus protocol such as the Industry Standard Architecture (ISA), Extended Industry Standard Architecture (EISA), or the Microchannel bus protocol. In the depicted embodiment, expansion bus 220 provides the means for connecting I/O devices such as a keyboard, a mouse, and a video display terminal. FIG. 2 illustrates the expansion bus 220 connected to a keyboard port 222 and a serial port 224. The features illustrated in FIG. 2 are exemplary and other configurations of server appliance 220 are within the scope of the present invention. As an example, keyboard port 222, display port 215, or serial port 224 (as well as a mouse port not depicted in FIG. 2) may be eliminated entirely in conjunction with the present invention to reduce costs.

Figure 3:
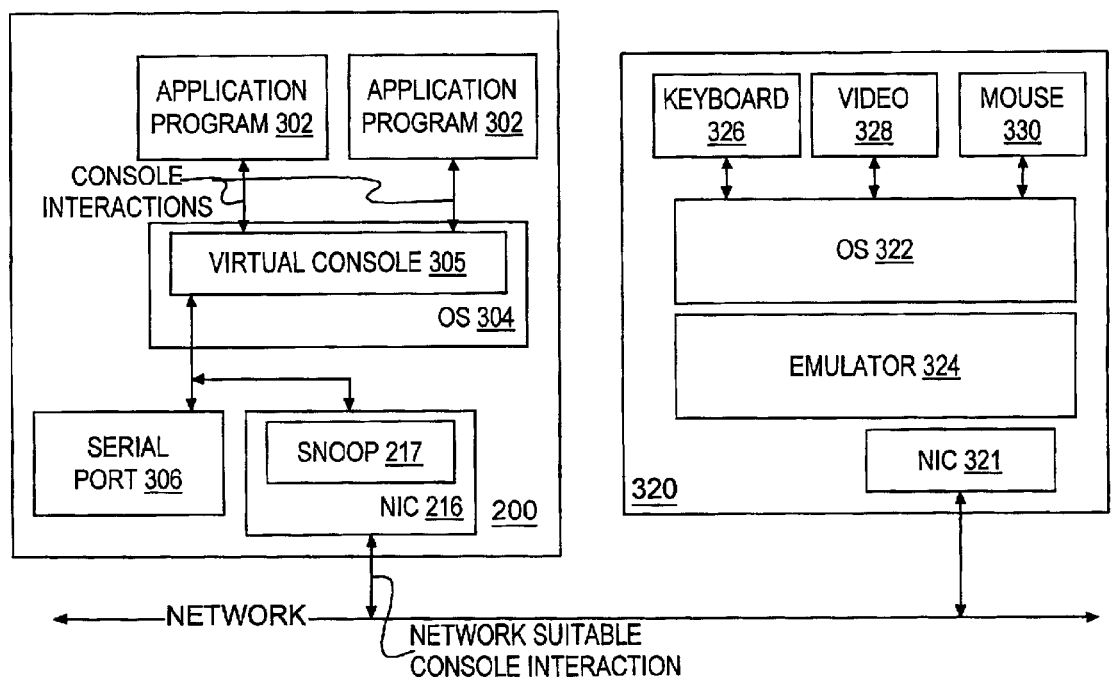
FIG. 3 is a block diagram of selected features of a data processing network according to one embodiment of the present invention.

Turning now to FIG. 3, a conceptualized representation of a system 300 configured according to the present invention to communicate console interactions between one or more server appliances 200 and a dedicated console server 320 is presented. Portions of system 300 as illustrated in FIG. 3 may be implemented as a set of computer executable instructions (software) stored on a computer readable medium. The computer readable medium may include any suitable storage device such as system memory 204, a CPU cache memory (not explicitly depicted), a floppy diskette, hard disk, Read Only Memory (ROM), CD ROM, DVD, or a flash memory device (flash card).

As depicted in FIG. 3, server appliance 200 includes and executes an operating system (OS) 304 that provides an operating environment for executing one or more application programs 302. OS 304 may comprise any of a number of commercially distributed operating systems including the AIX® operating system from IBM Corporation, any other UNIX based operating system, a network based OS such as JavaOS® from Sun Microsystems, or a Windows® type operating system from Microsoft. Among its many tasks, OS 304 may provide a console interface 305 to the applications programs 302 for displaying information on and requesting input from the console device. Console interface 305 is typically designed to be independent of the actual device or devices used to display and accept console interactions. Thus, application programs 302 are unaware of whether server appliance 200 is connected to a keyboard, mouse, and display device, a conventional KVM switch via a serial port, or to some other device for communicating console interactions. In a Unix-based operating system, for example, application programs access the console using reads and writes to a special file named "/dev/console".

FIG. 3 illustrates console interactions being exchanged between OS 304 and application programs 302. In one embodiment, OS 304 is enabled to route console interactions to a serial port such as a serial port 306 depicted in FIG. 3. This feature of OS 304 is present in many existing operating systems to enable serial transmission of console interactions to a KVM switch as described previously and may not need further refinement in conjunction with the present invention. In an x86 based system for example, the serial port is an I/O port with an address defined in the system configuration. OS 304 (or supporting firmware) uses the OUTB instruction to send console data and commands to the serial port and the INB instruction to receive data from the serial port or to read the port status.

The depicted embodiment of NIC 216 of server appliance 200 is configured to capture data or commands that OS 304 has targeted for the serial port. In one embodiment, NIC 216 includes a snooping unit 217 that snoops the serial port for data. Snooping unit 217 may be implemented in software, hardware, firmware, or a combination thereof. In addition, snooping unit 217 may be implemented in the system firmware (i.e., in a flash card or similar device on a motherboard of server appliance 200). Typically, snooping unit 217 comprises a flash card programmed with code suitable for detecting data at serial port 306. When data is detected, snooping unit 217 captures the data and modifies the data for transmission across the network. Typically, server appliance 200 supports the Dynamic Host Configuration Protocol (DHCP) to enable server appliance 200 to receive configuration parameters and possibly an operating system boot image from another machine through the network. DHCP is documented in Internet RFC 2131, *Dynamic Host Configuration Protocol* (Network Working Group 1997), available online at http://www.dhcp.org/rfc2131.html and incorporated by reference herein. Because DHCP requires support for basic Internet Protocol (IP) communications, snooping unit 217 may include firmware (or hardware) designed to format data according to the network protocol. When NIC 216 according to the present invention detects traffic headed for serial port 306, it modifies the serial port data, which is presumably formatted according to a serial protocol, by appending appropriate IP header information onto the data. The IP header information may include destination IP address information containing the IP address of console server 320. The console server IP address, along with other parameters may be passed to server appliance 200 as part of a DHCP boot process. In this manner, server appliance 200 is configured to capture serial port traffic, modify it to comply with a network protocol, and send it to NIC 216 for transmission over the network to console server 320.

As depicted in FIG. 3, system 300 further includes a console server 320 that provides console support for each server appliance 200 connected to the network. Console server 320 typically includes its own network interface card 321 through which IP formatted packets with the appropriate destination IF address (the IP address of console sewer 320) are detected. Console sewer 320 may further include an application program identified as emulator 324 that is responsible for enabling communication with the remote sewer appliances and for interpreting the serial data in each packet received from a sewer appliance.

Emulator 324 typically has a serial portion that includes the serial communication features of a standard serial communication emulator (such as the minicom emulator) that enables a device to communicate with a host over a serial line. These serial communication features of emulator 324 understand the serial protocol and control sequences that the server appliance uses to communicate with a console device attached to its serial port. In addition, emulator 324 has a network portion that includes network communication features enabling console server 320 to communicate with a host (i.e., server appliance) device using a network protocol such as IP. In one embodiment, the network communication features of emulator 324 are taken from the Telnet specification, which is designed to enable a remote device to communicate with a host over IP. The Telnet specification is documented in *Telnet Protocol Specification*, Internet RFC854 (Network Working Group 1983), available online at http://www.faqs.org/rfcs/rfc854.html and incorporated by reference herein. In a typical Telnet session, the remote device becomes a dumb terminal for the host device to which it is connected. Since Telnet has been in existence in various forms since as early as 1971 and is in wide use, it provides a familiar vehicle for enabling the network communication. Thus, emulator 324 may pattern its IP communication mechanisms after the communications routines of Telnet.

Console server 320 further includes an operating system 322 that provides an interface between emulator 324 and a keyboard 326, a video terminal 328, and a mouse 330. Emulator 324 uses the interface provided by OS 322 to direct the console interactions received from the network to video terminal 328. Emulator 324 uses the interface provided by OS 322 to accept input from keyboard 326 and mouse 330 and to transmit this input to the server appliance over the network using NIC 321.

In one embodiment, emulator 324 is configured to provide a windows based user interface where each window represents a console interaction session with a corresponding server appliance 200. In this embodiment, the user of console server 320 may initiate a console session with the desired server appliance by clicking the appropriate window. By associating each window with a network IP address of a corresponding server appliance, the network destination address of each console transaction can be determined by referring to the IP address associated with the active window.

It will be apparent to those skilled in the art having the benefit of this disclosure that the present invention contemplates a system and method for enabling console interactions to be communicated over a network connection thereby eliminating the requirement for a separate serial connection. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A server appliance configured for use in a data processing network, comprising:
    an application program suitable for issuing and receiving console transactions;
    an operating system configured to direct console transactions issued and received by the application program through a serial port;
    a snooping unit configured to capture the console transactions directed through the serial port and modify the transactions according to a network protocol; and
    a network interface card connecting the server appliance to a network and configured to transmit the modified transactions over the network.

2. The server appliance of claim 1, wherein the network protocol comprises an IP protocol.

3. The server appliance of claim 1, wherein the modification of console transactions by the network interface card includes appending an internet address to the transactions.

4. The server appliance of claim 3, wherein the internet address represents the internet address of a console server connected to the network.

5. The server appliance of claim 4, wherein the Internet address of the console server is provided to the server appliance as a boot parameter.

6. The server appliance of claim 5, wherein the boot parameter is provided to the server appliance during a DHCP supported boot process.

7. A data processing system, comprising:
    at least one server appliance connected to a network, the server appliance including an operating system configured to direct console transactions issued by the server appliance to a serial port and a network interface card configured to capture console transactions directed through the serial port, modify the captured transactions according to a network protocol, and transmit the modified transactions over the network as a network packet; and
    a console server connected to the network, wherein the console server includes a network interface card configured to receive the network packets, an emulator including a network portion configured to process network protocol information of the modified transactions and to a serial portion configured to interpret the console transactions contained in the modified transactions, and console devices including a keyboard, mouse, and display terminal configured to communicate console transactions with the emulator.

8. The system of claim 7, wherein the network portion of the emulator is Telnet compliant.

9. The system of claim 7, wherein the emulator is enabled to interpret the serial protocol used by the server appliance to communicate with its serial port.

10. The system of claim 7, further comprising a second server appliance connected to the network and configured to modify console transactions issued to a serial port of the second server appliance and to transmit the modified transactions to the console server.

11. The system of claim 7, wherein the network protocol comprises an IP protocol.

12. The system of claim 7, wherein the modification of console transactions by the network interface card includes appending an internet address to the transactions.

13. The system of claim 12, wherein the internet address represents the internet address of a console server connected to the network.

14. The system of claim 13, wherein the internet address of the console server is provided to the server appliance as a boot parameter.

15. The system of claim 14, wherein the boot parameter is provided to the server appliance during a DHCP supported boat process.

16. The system of claim 15, wherein the emulator is configured to display a first window for displaying console transactions occurring between the first server appliance and the console server and a second window for displaying console transactions occurring between the second server appliance and the console server.

17. A console server suitable for use in a data processing network, comprising:

console devices including a keyboard, mouse, and video terminal;

an operating system configured to communicate with the console devices;

a network interface card connecting the console server to a network; and an emulator configured to communicate with the console devices via the operating system, wherein the emulator includes a serial portion configured to interpret a serial protocol used by a server appliance connected to the network to communicate with its serial port and further wherein the emulator includes a network portion configured to enable the console server to communicate with the server appliance via the network interface card using a network protocol.

18. The server of claim 17, wherein the emulator is configured to present multiple windows to the video terminal, wherein each window represents a console session with a corresponding server appliance connected to the network.

19. The server of claim 17, wherein the network protocol complies with the Internet Protocol (IP).

20. The server of claim 17, wherein the network portion of the console server is compliant with the Telnet specification.

* * * * *

UNITED STATES PATENT AND TRADEMARK OFFICE
CERTIFICATE OF CORRECTION

PATENT NO. : 6,857,005 B2
DATED : February 15, 2005
INVENTOR(S) : Michael David Kistler and Freeman Leigh Rawson III It is certified that error appears in the above-identified patent and that said Letters Patent is hereby corrected as shown below:

Column 5,
Line 17, should read -- As depicted in FIG 3, system 300 further includes a console server 320 that provides console support for each server appliance 200 connected to the network. Console server 320 typically includes its own network interface card 321 through which IP formatted packets with the appropriate destination IP address (the IP address of console server 320) are detected. Console server 320 may futher include an application program identified as emulator 324 that is responsible for enabling communication with the remote server appliances and for interpreting the serial data in each packet received from a server appliance.

Column 7,
Line 20, claim 15 should read
15. The system of claim 14, wherein the boot parameter is provided to the server appliance during a DHCP supported boot process.

Signed and Sealed this

Thirty-first Day of May, 2005

JON W. DUDAS
*Director of the United States Patent and Trademark Office*